US008554026B2

(12) United States Patent
Chang et al.

(10) Patent No.: US 8,554,026 B2
(45) Date of Patent: Oct. 8, 2013

(54) LIGHT TRANSMISSION ASSEMBLY

(75) Inventors: Yen-Chih Chang, New Taipei (TW);
Ke-Hao Chen, New Taipei (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 159 days.

(21) Appl. No.: 13/070,502

(22) Filed: Mar. 24, 2011

(65) Prior Publication Data
US 2011/0235967 A1    Sep. 29, 2011

(30) Foreign Application Priority Data

Mar. 24, 2010    (TW) ................................ 99108800 A

(51) Int. Cl.
*G02B 6/12*    (2006.01)
*G02B 6/26*    (2006.01)
*G02B 6/10*    (2006.01)

(52) U.S. Cl.
USPC .................... 385/14; 385/38; 385/47; 385/50; 385/52; 385/131; 385/132

(58) Field of Classification Search
USPC ................. 385/27, 31, 39, 14, 38, 47, 50, 52, 385/88–92, 129–132
See application file for complete search history.

(56) References Cited

U.S. PATENT DOCUMENTS

2007/0183709 A1*    8/2007    Furuno et al. ................... 385/14

FOREIGN PATENT DOCUMENTS

JP    2002182048    6/2002
JP    2004191564    7/2004

* cited by examiner

*Primary Examiner* — Uyen Chau N Le
*Assistant Examiner* — Michael Mooney
(74) *Attorney, Agent, or Firm* — Wei Te Chung; Ming Chieh Chang

(57)    ABSTRACT

A light transmission assembly includes a light circuit board and a light transmission module. The board is embedded with waveguide layers, the waveguides layers includes core wires and shielding lays sandwiching the core wires, the waveguide layers defines a second light port portion of which the core wires defines vertical end faces. The light transmission module includes a base and a first light port portion projecting from a first face of the base, the first light port portion defines vertical end faces, the base defines a slanting surface at a second face opposite to the first face thereof. The first and second light port portions are aligned with each other when the light transmission module is coupled with light circuit board so that light lines go directly from the core wires through the light transmission module and reflect at the slant surface.

20 Claims, 8 Drawing Sheets

LIGHT TRANSMISSION ASSEMBLY

BACKGROUND OF THE INVENTION

1. Field of the Invention

The present invention relates to a light transmission assembly which is adapted for optical waveguides.

2. Description of Related Art

Signal transmission through optical fiber cables has been developed since light transmission is proven with more advantage than electrics transmission. Fiber cables and Optical PCB (OPCB) embedded with waveguides are used for light transmission presently. Generally, waveguides include core wires and protecting layers shielding the core wires. Light lines from and into the waveguides of the OPCB are achieved through lens module at a port of the OPCB, wherein the light lines reflex at a 45-degree angle slant surface. We hope to desire an improved light transmission assembly in basic of the conventional arts.

SUMMARY OF THE INVENTION

An object of the present invention is to provide a light transmission assembly which is adapted for optical waveguides.

In order to achieve above-mentioned object, a light transmission assembly comprises a light circuit board and a light transmission module, the board is embedded with waveguide layers, the waveguide layers comprise core wires and shielding lays sandwiching the core wires, the waveguide layers define a second light port portion of which the core wires define vertical end faces. The light transmission module comprises a base and a first light port portion projecting from a first face of the base, the first light port portion defines vertical end faces, the base defines a slanting surface at a second face opposite to the first face thereof. The first and second light port portions are aligned with each other when the light transmission module is coupled with light circuit board so that light lines go directly from the core wires through the light transmission module and refract at the slant surface Other objects, advantages and novel features of the present invention will become more apparent from the following detailed description of the present embodiment when taken in conjunction with the accompanying drawings.

DETAILED DESCRIPTION OF THE INVENTION

Figure 1:
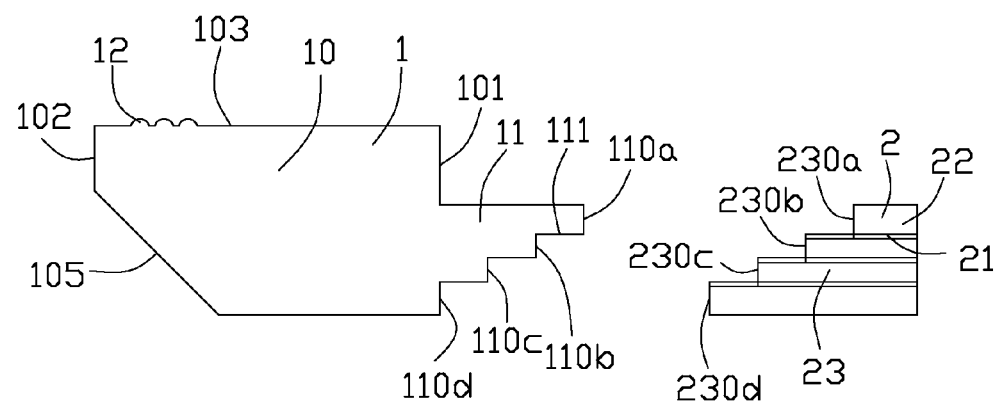
FIG. 1 is a plane schematic view of a light transmission assembly including a light transmission module and a waveguide module before coupled, of this present invention.

Reference will now be made to the drawing figures to describe the preferred embodiment of the present invention in detail.

Figure 2:
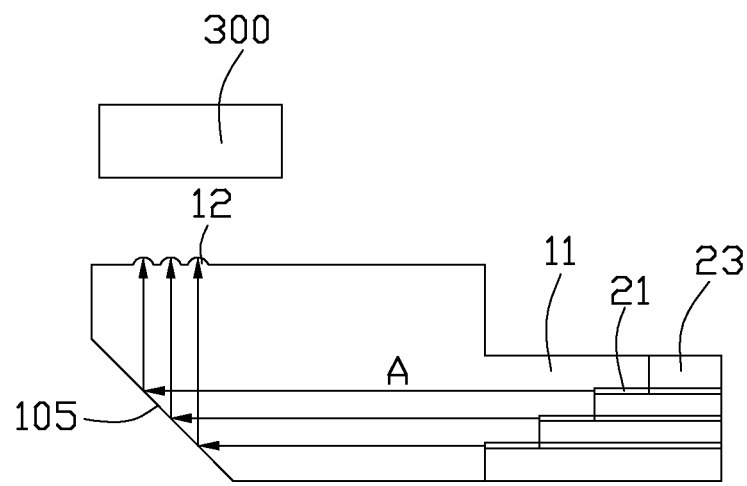
FIG. 2 is a plane schematic view of the light transmission assembly after coupled with each other.

FIGS. 1 and 2 show schematic diagrams of an light transmission assembly including a light transmission module 1 and a waveguide module 2. The light transmission 1 is formed with a plastic base 10, a first light port (receiving or emitting) portion 11 perpendicularly and integrally projecting from a first face 101 of the base 10 in a first direction. A bottom face 111 perpendicular to the first face 101, of the first light port portion 11 is shaped with steps, three steps in this embodiment. So four end faces 110a-110d perpendicularly to the bottom face 111, are formed at front faces of the light port portion 11 in a gradually inside form. The different bottom faces 111 are functioned as first coupling faces. A second face 102 opposite to the first face 101 defines a slanting face 105 which is aligned with the light port portion 11 in the first direction, at a 135-degree angle to the bottom face 111, the slant face 105 being functioned as a reflecting face. A third face 103 jointing with the first and second faces at the top thereof and facing to the slanting face 105, has three bumps 12 projecting outwards, the bump being functioned as refracting lenses 12 to focus light lines. The slanting face 105 joints with the second face 102 and the bottom or forth face opposite the third face 103.

The waveguide module 2 is constructed with three waveguide layers which include three core wire layer 21 in this embodiment and shielding layers 22 sandwiching each core wire layer at the upper and lower surface of each core wire layer to shield the core wires for protecting the core wires. The light lines A go within the core wires 21 so as to transmit signals. The shielding layers 22 also can prevent the light lines in the core wire layers from refracting, thereby avoiding declining of signals. Distal ends of the shielding layers 22 are cut off partially to expose the core wire 21 to function as a second light port (emitting or receiving) portion 23 which is intended to couple with the first light port portion 11. The second light port portion 23 is disposed in shape of three steps to correspond to the first light port portion 11. The end faces 230a~230d of the second light port portion 23 are perpendicular to the extending direction (i.e. the first direction) of the waveguides. Particularly, the end faces are designated to the end faces of the core wires 21. Referring to the FIG. 2, the first light port portion 11 of the transmission module is just coupled with the second light port portion 23 by the first and second coupling faces confronting with each other in a second direction perpendicular to the first direction and the end faces of the first and second light port portions are aligned with each in the first direction. The light lines A go to the light transmission module 1 through the core wires 21 until the light lines arrive at the slant face 105, reflecting at 90-degrees angle. Therefore the light lines A refract through the lenses 12 to outer elements 300.

An embodiment will be given hereinafter to illustrate the present invention wherein the same elements use the same numerals.

Figure 3:
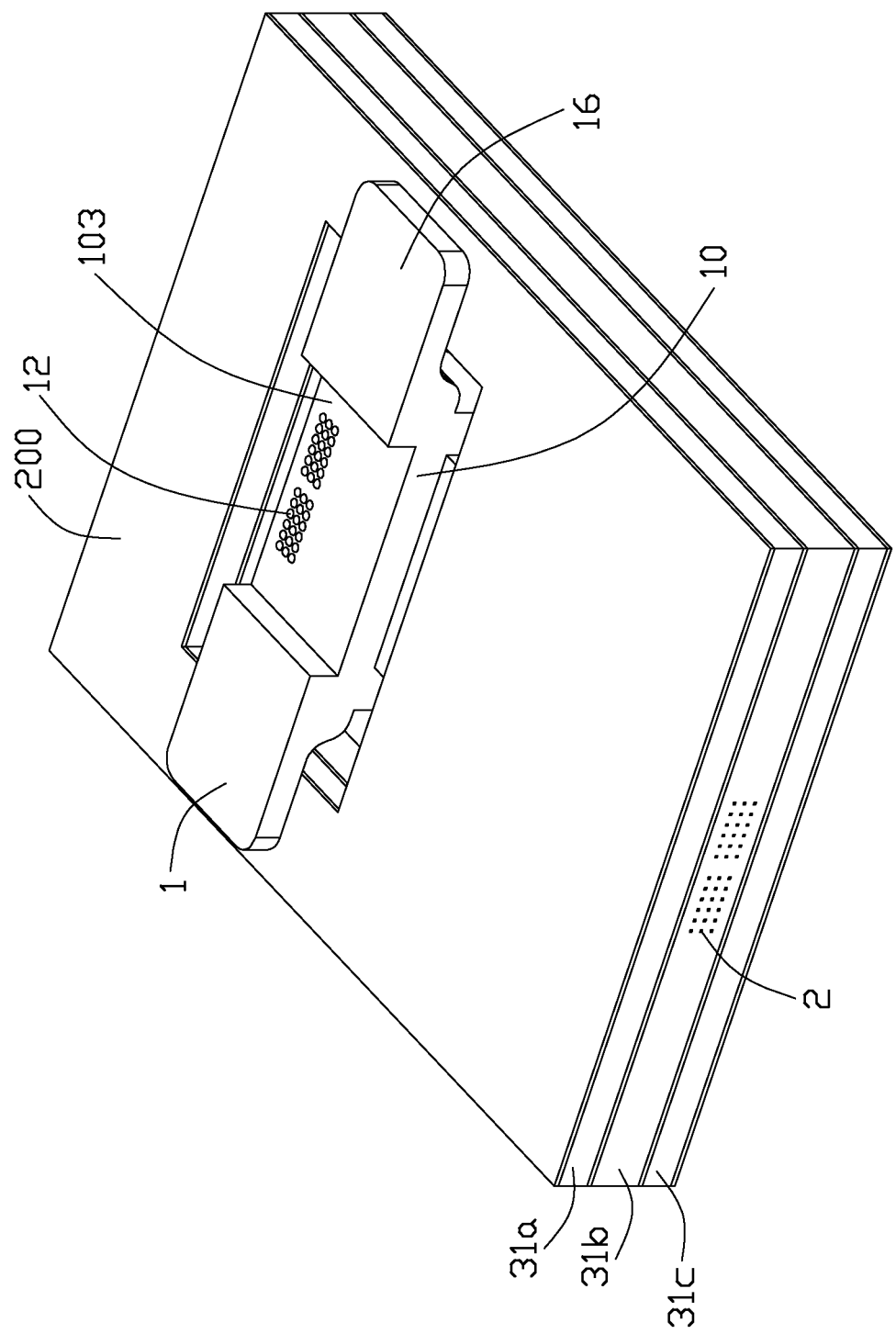
FIG. 3 is a perspective view of the assembly showing an embodiment of the present invention.
Figure 4:
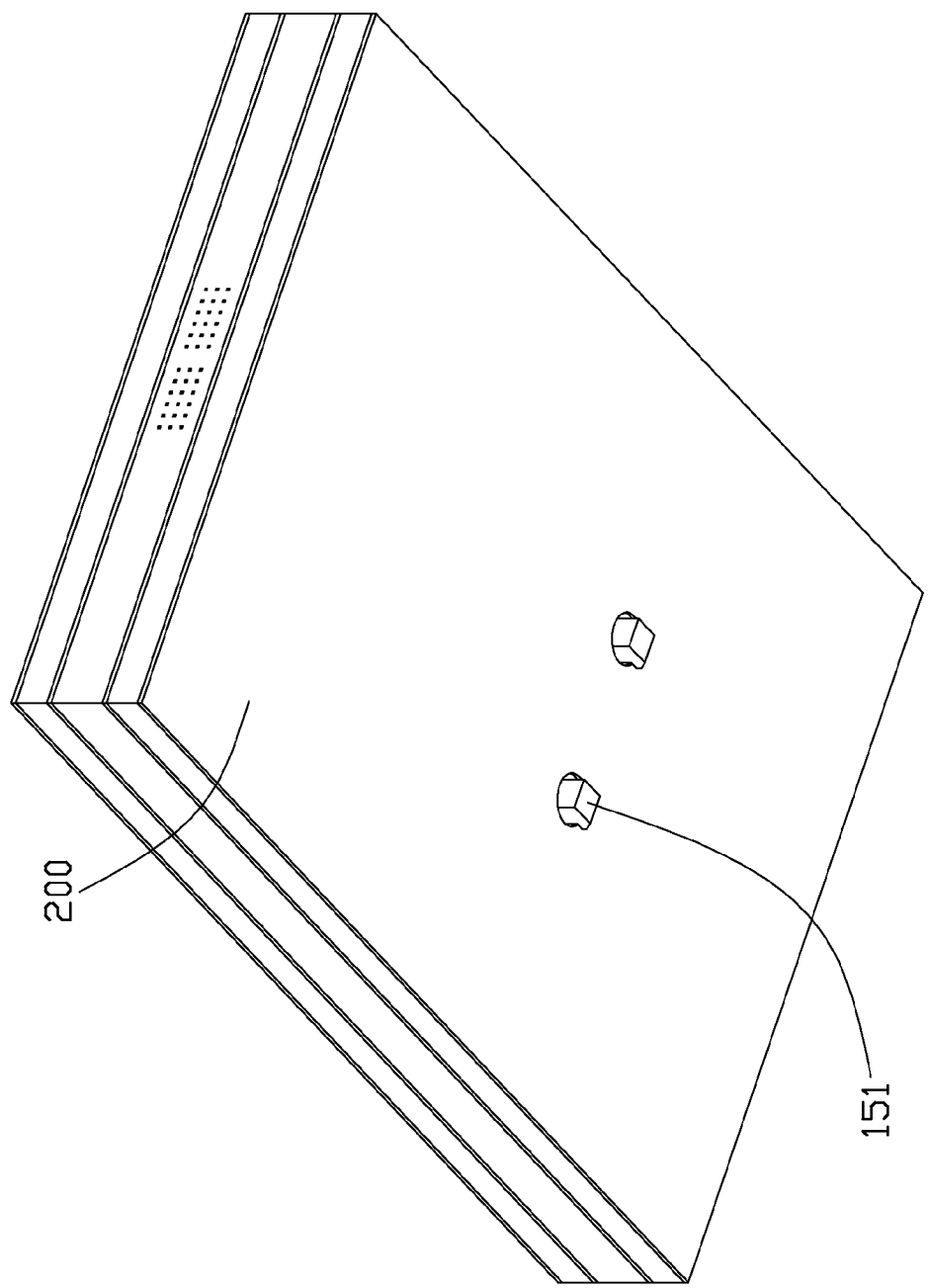
FIG. 4 is similar to FIG. 3 from another inspect.
Figure 5:
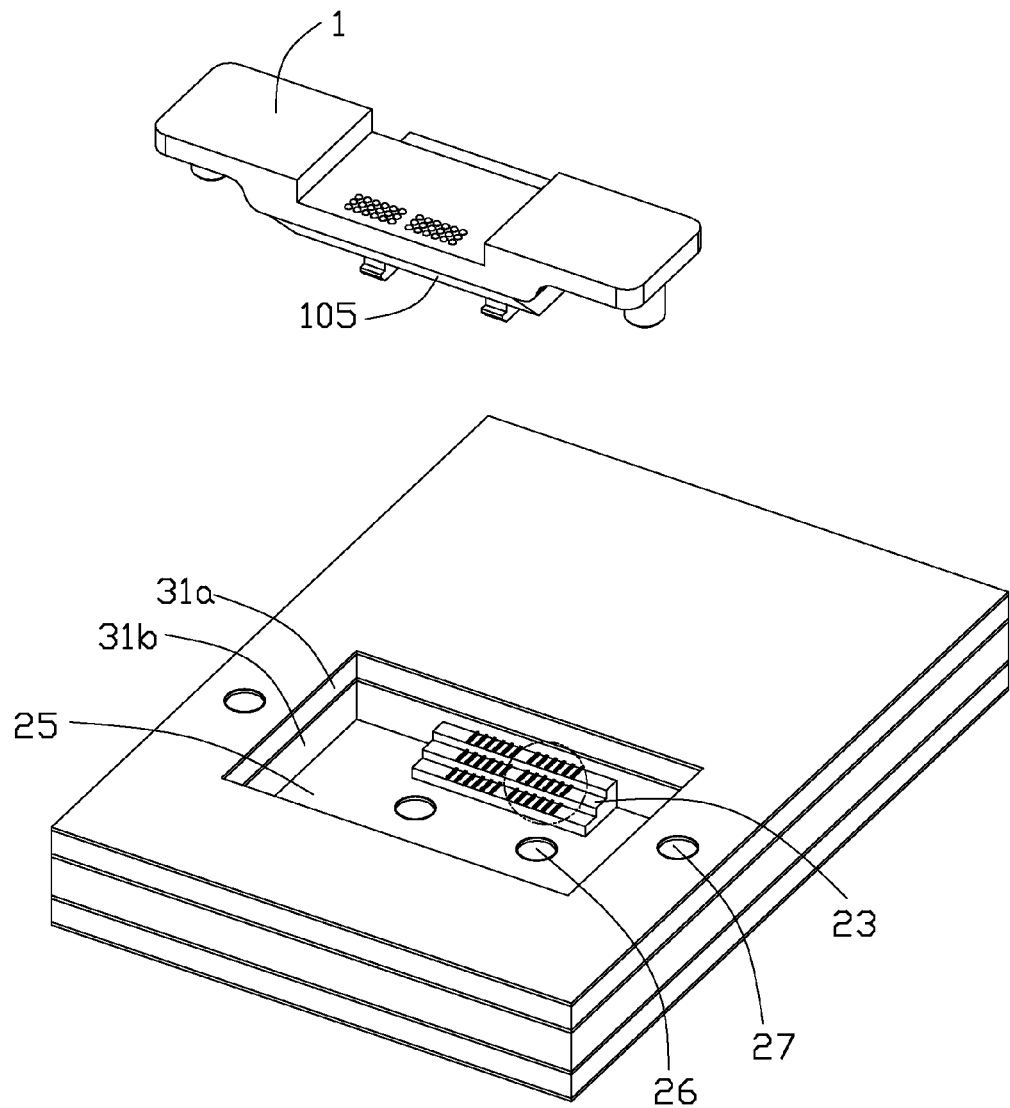
FIG. 5 is an exploded perspective view of the assembly.
Figure 6:
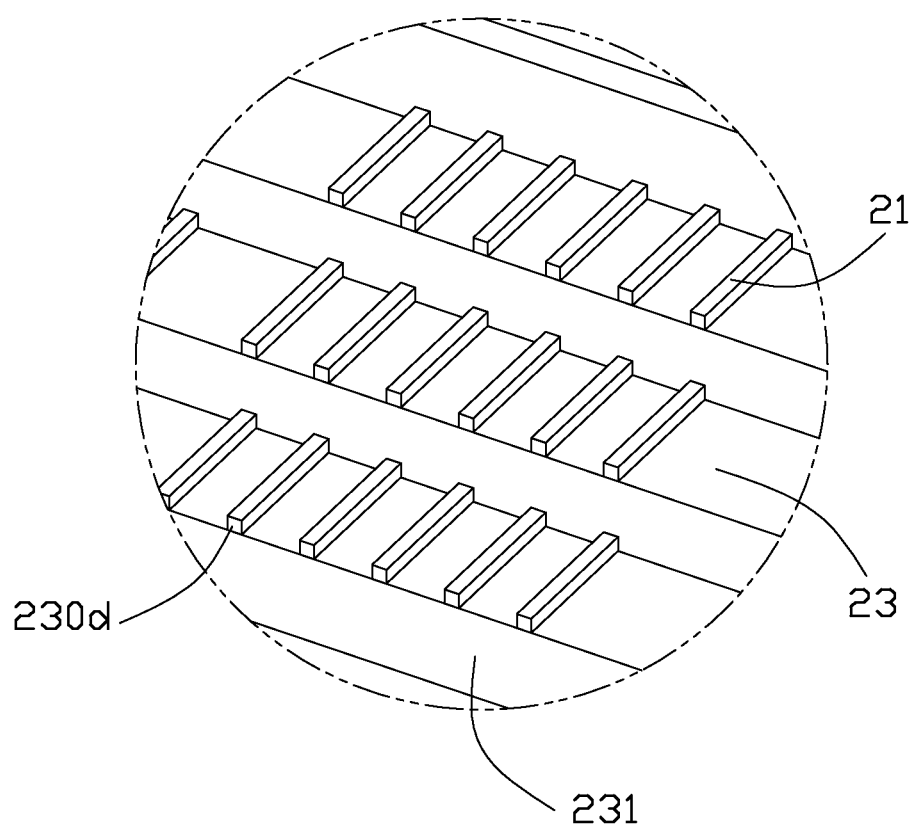
FIG. 6 is an enlarged view of the part circled in FIG. 5.

Referring to FIGS. 3 through 5, in this embodiment the waveguide module 2 is in a form of a light circuit board 200, which is constructed with three layers 31a, 31b, 31c, and the waveguide layers are embedded in the middle layer 31b. The outer two shielding layers 31a, 31c can embedded with other circuits or only protect the middle layer. Please note as shown in FIG. 5, the light circuit board 200 is cut to define a recess 25 through one surface thereof at a pre-determined position. The second light port portion 23 in step form are exposed in the recess 25 and as best shown in FIG. 6 each core wire layer includes a plurality of core wires 21 extending in the first direction and parallel spacing from each other in the second direction. In manufacturing process parts of the shielding layers 22 are cut off to expose the core wire since the core wires 21 are embedded in the shielding layers 22. The core wires are disposed beyond the second coupling face 231 in the second direction. The recess 25 further defines two retaining holes 26 through the bottom inside face of the recess 25 and the bottom surface of the light circuit board 200, which are located in front of the second light port portion 21.

Figure 7:
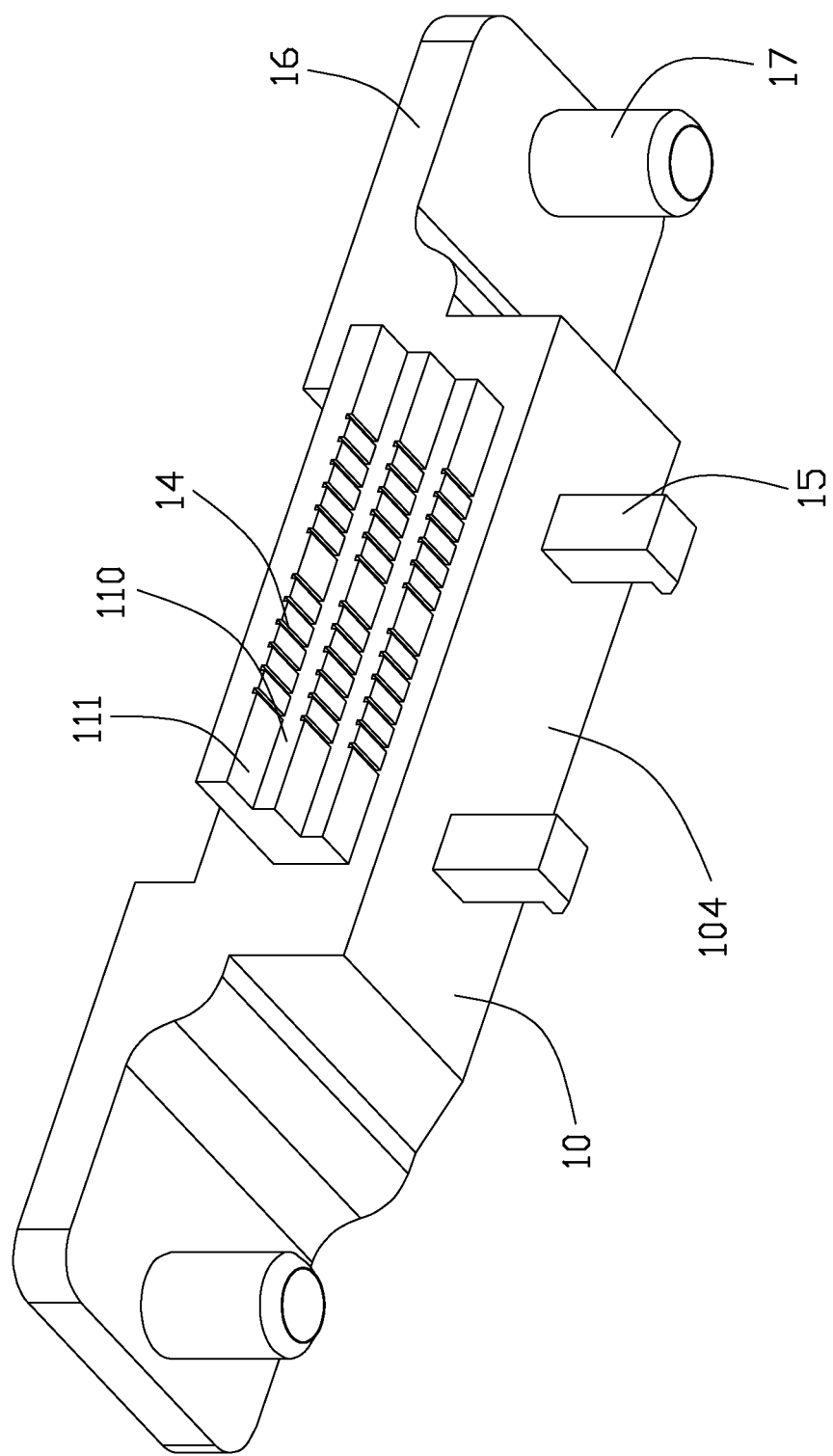
FIG. 7 is a perspective view of the light transmission module.
Figure 8:
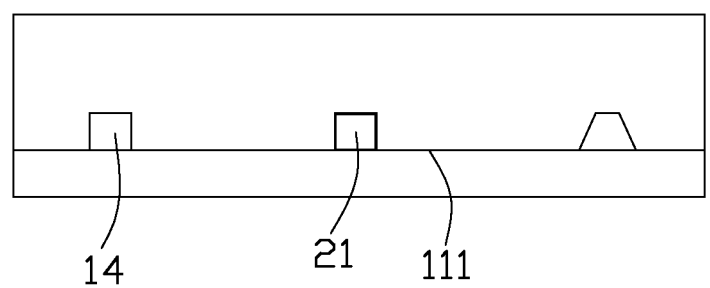
FIG. 8 is a schematic view showing an engagement of the recesses and the waveguides.

Referring to FIGS. 5 and 7, the first light port portion 11 of the transmission module 1 has the first couple face 111 in shape of three steps, which are recessed towards the third face 103 with grooves 14. The grooves 14 extend towards the base 10 until arrive at but do not through the end faces 110. The forth face 104 defines a pair of latching portions 15 extending downwards which are used to be inserted and locked in the retaining holes 26 of the light circuit board 200 as shown in FIG. 4. The base 10 is assembled in the recess 25 and the first and second light port portions are coupled with each other wherein a pair of mounting flanges 16 extending from upper edges of the base 10 press against the upper surface of the light circuit board 200 and a retaining post 17 extending downwards from a bottom of the mounting flange is inserted and retained in retaining holes 27 defined at two sides of the recess 25 on the upper face of the light circuit board 200. The upper face i.e. the third face 103 of the base 10 is lower than the upper face of the mounting flanges so that the upper face of the light transmission module 1 is in shape of recess, thereby benefiting the coupled position of the light transmission module 1 and the outer element 300. Referring to FIG. 8, the cross sections of the grooves can be a shape of rectangle, trapezoidal, to receive the core wires 21.

The core wires have vertical end faces so that the light lines A go through the end faces without refraction. The first light port portion also have vertical end faces. Therefore the light lines go linearly directly until the light lines arrive at the slant surface 105. The exploding core wires 21 and the grooves 14 benefit alignment of said two elements.

However, the disclosure is illustrative only, changes may be made in detail, especially in matter of shape, size, and arrangement of parts within the principles of the invention.

What is claimed is:

1. A light transmission assembly comprising:
    a light circuit board embedded with waveguide layers, the waveguide layers comprising core wires and shielding lays sandwiching the core wires, the waveguide layers defining a second light port portion of which the core wires define vertical end faces;
    a light transmission module disposed discretely from the light circuit board, the light transmission module comprising a base and a first light port portion projecting from a first face of the base, the first light port portion defining vertical end faces, the base defining a slanting surface at a second face opposite to the first face thereof;
    wherein the first and second light port portions are aligned with each other when the light transmission module is coupled with light circuit board so that light lines go directly from the core wires through the light transmission module and reflect at the slant surface.

2. The light transmission assembly as described in claim 1, wherein the shielding layers of the second light port portion are partly removed to expose the core wires, the first light port portion of the light transmission module defines parallel grooves to receive the core wires when the light transmission module is coupled with the light circuit board.

3. The light transmission assembly as described in claim 2, wherein the first light port portion is in shape of steps which comprises a plurality of first coupling faces perpendicular to the end faces of core wires, the grooves communicating with an exterior through the first coupling faces, the second light port portion defines a plurality of second coupling faces confronting with the first coupling face, the core wires project beyond the first coupling face.

4. The light transmission assembly as described in claim 3, wherein the first light port portion is constructed with three steps.

5. The light transmission assembly as described in claim 4, wherein the light circuit board defines a recess through a surface thereof, the second light port portion is integrally disposed in the recess and opens to said surface, the light transmission module is assembled in the recess.

6. The light transmission assembly as described in claim 5, wherein the base of the light transmission defines two latching portions retained in retaining holes defined in a bottom inside of the recess.

7. The light transmission assembly as described in claim 6, wherein the light transmission defines a pair of mounting flanges extending from the base, the mounting flanges are higher than corresponding face of the base.

8. The light transmission assembly as described in claim 7, wherein the grooves can be in a shape of rectangle or trapezoidal.

9. A light transmission module, comprising:
    a base defining opposite first and second faces and opposite third and forth faces connecting with the first and second faces;
    a first light port portion integrally projecting from the first face of the base, the first light port portion being in step shape and having first coupling faces and end faces perpendicular to the first coupling face;
    lenses integrally projecting outwards at the third face of the base;
    wherein the base defines a slant reflex face, and the lenses and the first light port portion are aligned with the slant reflex face in different directions.

10. A light transmission assembly comprising:
    a waveguide module defining a plurality of light paths terminated at a roughly obliquely arranged first light port portion;
    a light transmission module defining a roughly obliquely arranged second light port portion complementarily coupled to said first light port portion and essentially aligned with each other in an extension manner along a first direction;
    a slanting reflection face formed on the light transmission module spaced from and opposite to an interface of said coupled first and second light port portions in said first direction so as to receive light coming therefrom; and
    a plurality of lens-like structure formed on the light transmission module and opposite to said slanting reflection face in a second direction perpendicular to said first direction; wherein
    the light coming from the coupled first and second light port portions hits the slanting reflection face in the first direction, and is subsequently deflected toward the lens-like structure in said second direction.

11. The light transmission assembly as claimed in claim 10, wherein the light transmission module is assembled to the waveguide module.

12. The light transmission assembly as claimed in claim 10, wherein the waveguide module is essentially an optical circuit board with multiple layers thereof.

13. The light transmission assembly as claimed in claim 10, wherein the coupled first and second light port portions define therebetween an interface essentially along an imaginary slanting face which is roughly perpendicular to the slanting reflection face.

14. The light transmission assembly as claimed in claim 10, wherein the first light port portion and the second light port portion are both of a stepped structure.

15. The light transmission assembly as claimed in claim 10, wherein said waveguide module defines a cavity into which the light transmission module is received.

16. The light transmission assembly as claimed in claim 15, wherein the light transmission module is equipped with a latch device locked to the waveguide module.

17. The light transmission assembly as claimed in claim 16, wherein the light transmission module and the waveguide module are equipped alignment devices for aligning the light transmission module to the waveguide module in the second direction during assembling.

18. The light transmission assembly as claimed in claim 10, wherein said light transmission module is discrete from the waveguide module.

19. The light transmission assembly as claimed in claim 11, wherein said light transmission module is assembled to the waveguide module along a third direction opposite to the first direction.

20. The light transmission assembly as claimed in claim 11, wherein said light transmission module and said waveguide module are configured to be capable of being disassembled from each other.

* * * * *